United States Patent

Blaum et al.

[11] Patent Number: 5,903,410
[45] Date of Patent: May 11, 1999

[54] DISK DRIVE USING MULTIPLE SERVO TIMING MARKS THAT FORM A CODE OF UNIQUE INTERRELATED BIT PATTERNS

[75] Inventors: Mario Blaum, San Jose; Steven Robert Hetzler, Sunnyvale; William John Kabelac, Morgan Hill, all of Calif.

[73] Assignee: International Business Machines Corporation, Armonk, N.Y.

[21] Appl. No.: 08/823,435

[22] Filed: Mar. 24, 1997

[51] Int. Cl.$^6$ .................................................. G11B 5/596
[52] U.S. Cl. .................................. 360/77.08; 360/77.06; 360/78.04; 360/78.14
[58] Field of Search ............................. 360/77.08, 77.11, 360/77.07, 77.06, 77.05, 77.02, 77.01, 75, 69, 53, 48, 51, 39, 78.04, 78.14

[56] References Cited

U.S. PATENT DOCUMENTS

| | | | |
|---|---|---|---|
| 4,631,606 | 12/1986 | Sugaya | 360/78 |
| 4,823,212 | 4/1989 | Knowles et al. | 360/77.08 |
| 4,933,786 | 6/1990 | Wilson | 360/78.14 |
| 5,162,954 | 11/1992 | Miller et al. | 360/72.2 |
| 5,231,545 | 7/1993 | Gold | 360/49 |
| 5,255,131 | 10/1993 | Coker et al. | 360/48 |
| 5,307,216 | 4/1994 | Cook et al. | 360/72.1 |
| 5,315,456 | 5/1994 | Hessing et al. | 360/77.08 |
| 5,384,671 | 1/1995 | Fisher | 360/51 |
| 5,442,499 | 8/1995 | Emori | 360/77.08 |
| 5,448,571 | 9/1995 | Hong et al. | 370/105.4 |
| 5,544,135 | 8/1996 | Akin, Jr. et al. | 369/32 |
| 5,640,538 | 6/1997 | Dyer et al. | 360/77.08 X |
| 5,684,972 | 11/1997 | Hill et al. | 360/77.08 X |

OTHER PUBLICATIONS

J. L. Conway et al., "Digital Encoding Scheme with Error Detection", *IBM Technical Disclosure Bulletin*, vol. 32, No. 6A, Nov. 1989, pp. 275–276.

*Primary Examiner*—Muhammad N. Edun
*Attorney, Agent, or Firm*—Thomas R. Berthold

[57] ABSTRACT

A data recording disk drive has a plurality of servo sectors containing error-detectable and error-correctable servo timing marks (STMs). Each STM is represented as a pattern of n bits of digital information, with each track having a set of m unique STM patterns, and wherein each of the m unique STM patterns of n bits has a minimum sliding distance d to every other STM pattern in the set, where d is greater than one. The error-tolerant STMs are achieved by the use of a set or code of fixed STM bit patterns, where the STM patterns have a specified minimum Hamming distance against all the patterns in the search, called the sliding distance d. These STM patterns may include any bits associated with the servo sectors, such as bits indicating track index, servo sector number, and recording head number. The disk drive includes STM decoding circuitry that recognizes valid STMs when the sliding distance between the repeating preamble pattern and the STM patterns are within predetermined limits defined by the power of the code. The disk drive allows a tradeoff between error correction power and error detection power, within the limits defined by the code. The STM decoding circuitry is adaptive by allowing the error correction and error detection comparison values to be updatable.

61 Claims, 9 Drawing Sheets

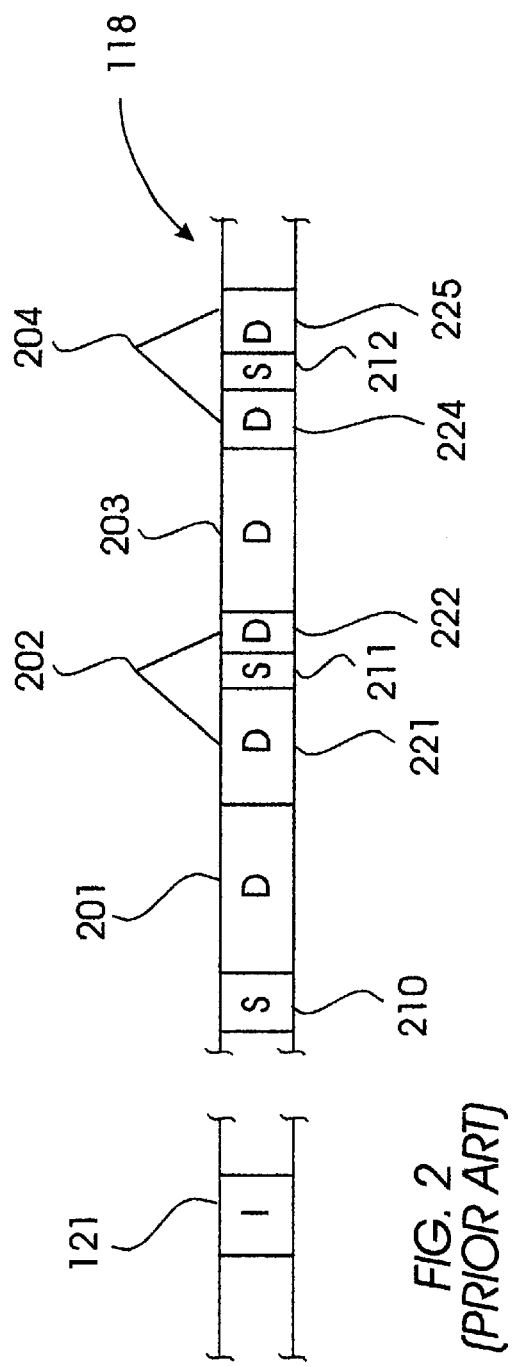
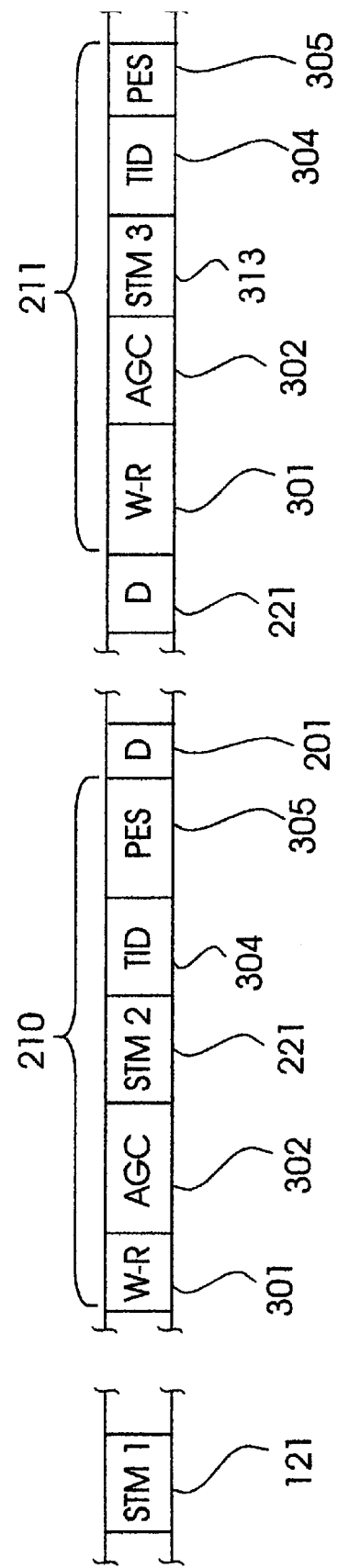
FIG. 2 (PRIOR ART)
FIG. 3

| Distance | AGC | | | | | | | Pattern 1 | | | | | | | |
|---|---|---|---|---|---|---|---|---|---|---|---|---|---|---|---|
| | ... 1 | 1 | 1 | 1 | 1 | 1 | 1 | 0 | 0 | 0 | 0 | 0 | 1 | 0 | ... |
| 6 | 0 | 0 | 0 | 0 | 0 | 1 | 0 | | | | | | | | |
| 5 | | 0 | 0 | 0 | 0 | 0 | 1 | 0 | | | | | | | |
| 6 | | | 0 | 0 | 0 | 0 | 0 | 1 | 0 | | | | | | |
| 5 | | | | 0 | 0 | 0 | 0 | 0 | 1 | 0 | | | | | |
| 4 | | | | | 0 | 0 | 0 | 0 | 0 | 1 | 0 | | | | |
| 3 | | | | | | 0 | 0 | 0 | 0 | 0 | 1 | 0 | | | |
| 3 | | | | | | | 0 | 0 | 0 | 0 | 0 | 1 | 0 | | |
| 0 | | | | | | | | 0 | 0 | 0 | 0 | 0 | 1 | 0 | |

*FIG. 5A*

| Distance | AGC | | | | | | | Pattern 2 | | | | | | | |
|---|---|---|---|---|---|---|---|---|---|---|---|---|---|---|---|
| | ... 1 | 1 | 1 | 1 | 1 | 1 | 1 | 0 | 0 | 1 | 0 | 1 | 1 | 1 | ... |
| 6 | 0 | 0 | 0 | 0 | 0 | 1 | 0 | | | | | | | | |
| 5 | | 0 | 0 | 0 | 0 | 0 | 1 | 0 | | | | | | | |
| 6 | | | 0 | 0 | 0 | 0 | 0 | 1 | 0 | | | | | | |
| 6 | | | | 0 | 0 | 0 | 0 | 0 | 1 | 0 | | | | | |
| 3 | | | | | 0 | 0 | 0 | 0 | 0 | 1 | 0 | | | | |
| 5 | | | | | | 0 | 0 | 0 | 0 | 0 | 1 | 0 | | | |
| 3 | | | | | | | 0 | 0 | 0 | 0 | 0 | 1 | 0 | | |
| 3 | | | | | | | | 0 | 0 | 0 | 0 | 0 | 1 | 0 | |

*FIG. 5B*

| Distance | AGC | | | | | | | Pattern 1 | | | | | | | |
|---|---|---|---|---|---|---|---|---|---|---|---|---|---|---|---|
| | ...1 | 1 | 1 | 1 | 1 | 1 | 1 | 0 | 0 | 0 | 1 | 0 | 1 | 1 | ... |
| 3 | 0 | 0 | 0 | 1 | 0 | 1 | 1 | | | | | | | | |
| 4 | | 0 | 0 | 0 | 1 | 0 | 1 | 1 | | | | | | | |
| 4 | | | 0 | 0 | 0 | 1 | 0 | 1 | 1 | | | | | | |
| 4 | | | | 0 | 0 | 0 | 1 | 0 | 1 | 1 | | | | | |
| 3 | | | | | 0 | 0 | 0 | 1 | 0 | 1 | 1 | | | | |
| 3 | | | | | | 0 | 0 | 0 | 1 | 0 | 1 | 1 | | | |
| 3 | | | | | | | 0 | 0 | 0 | 1 | 0 | 1 | 1 | | |
| 0 | | | | | | | | 0 | 0 | 0 | 1 | 0 | 1 | 1 | |

DISK DRIVE USING MULTIPLE SERVO TIMING MARKS THAT FORM A CODE OF UNIQUE INTERRELATED BIT PATTERNS

TECHNICAL FIELD

This invention relates to disk drives that store recorded digital data, and in particular to disk drives that use servo sectors with servo timing marks (STMs) for maintaining the recording heads on the data tracks during read and write operations.

BACKGROUND OF THE INVENTION

Magnetic recording disk drives incorporate stacked, commonly-rotated rigid magnetic recording disks that are used for storage of user data. The data is recorded in radially-spaced data tracks on the surfaces of the disks. Recording heads are moved by an actuator in a generally radial path toward and away from the center of rotation of the disks to read and write data on the disks. Typically, a single recording head, which may be an inductive read/write head or an inductive write head in combination with a magnetoresistive read head, is associated with a corresponding magnetic recording surface of each disk.

It is necessary to know the precise radial and circumferential location of the recording heads relative to their associated disk surfaces. Radial position information is recorded on the disk as servo information and is used to locate the heads to the desired data tracks and maintain the heads over the desired data tracks during read and write operations. Circumferential position information is used to identify the start of different data fields located around the tracks. In conventional fixed-block architecture disk drives, the data is located in fixed-length angular data sectors and the servo information is located in angularly-spaced servo sectors that are interspersed among the data sectors. This type of disk drive is referred to as a sector servo or embedded servo disk drive.

In embedded servo disk drives, each of the servo sectors contains a servo timing mark (STM) that is read by the head to initiate the subsequent detection of servo information in the form of position error signal (PES) bursts. The PES bursts are decoded by the servo electronics to calculate the radial position of the head and provide feedback to the actuator to reposition the head to maintain it along the centerline of the desired track. In a specific type of fixed-block architecture embedded servo disk drive that incorporates a "No-ID"™ brand of headerless architecture where there are no identification (ID) fields to locate the data sectors, the STMs are also used to assist in locating the specific data sectors where user data is to be read or written. This type of disk drive is described in IBM's U.S. Pat. No. 5,500,848.

Accurate detection of STMs is crucial to proper disk drive operation since it is necessary to correctly recognize subsequent servo information (PES bursts) and track ID information that are located in the servo sectors after the STMs. If a servo sector is not recognized because of errors in the STM, the servo electronics will generate servo timing information based on previous STMs and servo tracking and timing accuracy will be diminished. Also, if the servo electronics incorrectly detects an STM at the wrong location because of an error condition, incorrect data will be sent to the track ID decoder and PES decoder, resulting in missed or incorrectly interpreted track ID and head position. Correct identification of the STM located at the index (the beginning of the track) is also important in disk drives with headerless architectures because the location of the appropriate data sectors for reading and writing data begins with identification of the index STM.

Prior art disk drives attempted to improve the reliability of reading servo timing marks by the use of redundant STM bit patterns adjacent to one another and the use of specific types of a single bit pattern for all STMs that can tolerate up to a fixed number of bit errors. These methods are inefficient and do not allow the use of multiple STM patterns capable of being accurately decoded by the servo electronics. Moreover, none of the prior art disk drives allow any modification in the STM correction and detection power.

What is needed is a disk drive that can accurately detect multiple types of STM patterns so that STMs can be used to identify different parameters, such as track ID, track index and head number, even when any one or more of these multiple STM patterns contains bit errors, and that can be modified or adapted to alter the error correction and/or detection power.

SUMMARY OF THE INVENTION

The present invention is a data recording disk drive that has a plurality of servo sectors containing error-detectable and error-correctable servo timing marks (STMs). Each STM is represented as a pattern of n bits of digital information, with each track having a set of m unique STM patterns, and wherein each of the m unique STM patterns of n bits has a minimum sliding distance d to every other STM pattern in the set, where d is greater than one. The error-tolerant STMs are achieved by the use of a set or code of fixed STM bit patterns, where the STM patterns have a specified minimum Hamming distance against all the patterns in the search, called the sliding distance d. The Hamming distance between two patterns refers to the number of bits which are different in the two patterns. Operationally, it is the number of ones in the pattern resulting from the exclusive OR'ing of two input patterns. The sliding distance for a set of STM patterns determines its error correction powers. The STM codes can also handle burst errors by treating each burst (of up to the burst length) as a single error event for the purpose of computing the Hamming and sliding distances. These STM patterns may include any bits associated with the servo sectors, such as bits indicating track index, servo sector number, and recording head number.

The disk drive includes STM decoding circuitry that recognizes valid STMs when the sliding distance between the repeating preamble pattern and the STM patterns are within predetermined limits defined by the power of the code. The disk drive allows a tradeoff between error correction power and error detection power, within the limits defined by the code. Thus, an optimal STM code design may require that part of the detection power be sacrificed for correction, or part of the correction power be sacrificed for detection. Also, the error-tolerant STM patterns in the code not only assure a reliable indication of the beginning of servo sectors, but also provide an indication of the disk drive's health. Because part of the detection process requires that the number of bits in error be monitored, bit errors monitored over time are used for predictive failure analysis of the disk drive. This information allows the disk drive user to take corrective action, such as backing up of data.

The STM decoding circuitry is also adaptive by allowing the error correction and error detection comparison values to be updatable. This allows the disk drive manufacturer to set the value at any time. For example, during the early phases of a manufacturing program, it is likely that the error rate may be higher than it would be for a mature program. It may therefore be beneficial to have a lower correction level (hence higher detection level) during the early phases of manufacturing to increase the yield. Once the process is better controlled, the level of correction can be increased, providing a performance boost at the same time.

For a fuller understanding of the nature and advantages of the present invention, reference should be made to the following detailed description taken together with the accompanying figures.

BRIEF DESCRIPTION OF THE DRAWINGS

FIG. 2 is an illustration of the track format for the disk drive of FIG. 1 illustrating data sectors split by servo sectors.

FIG. 3 is an illustration of the servo sectors in the track format of the type shown in FIG. 2, but with three unique servo timing marks (STMs) that form the STM code according to the present invention.

FIG. 5A shows the input data patterns of a (7,2,3) STM code at different shift locations when STM1 is both the input pattern and the search pattern.

FIG. 5B shows the input data patterns of a (7,2,3) STM code at different shift locations when STM2 is the input pattern and STM1 is the search pattern.

FIG. 6 shows the input data patterns, with 2-bit bursts highlighted, of a (7,1,3:2) STM code with a 2-bit burst error correction power at different shift locations when STM1 is both the input pattern and the search pattern.

FIGS. 8A–8C show the input data patterns of a (10,5,4) STM code at different shift locations when STM2, with a single bit error, is the input pattern and all five STM patterns are searched.

DETAILED DESCRIPTION OF THE INVENTION

Prior Art

The present invention to be described is applicable to data recording disk drives that use recorded servo information to position the recording head on the data tracks. While the prior art and preferred embodiments will be described with respect to a magnetic recording disk drive that uses a fixed-block architecture and servo information that is embedded between data fields in the concentric data tracks, the invention is fully applicable to magnetic recording disk drives that use other data architectures and servo techniques and to optical disk drives that have servo information in spiral tracks.

Figure 1:
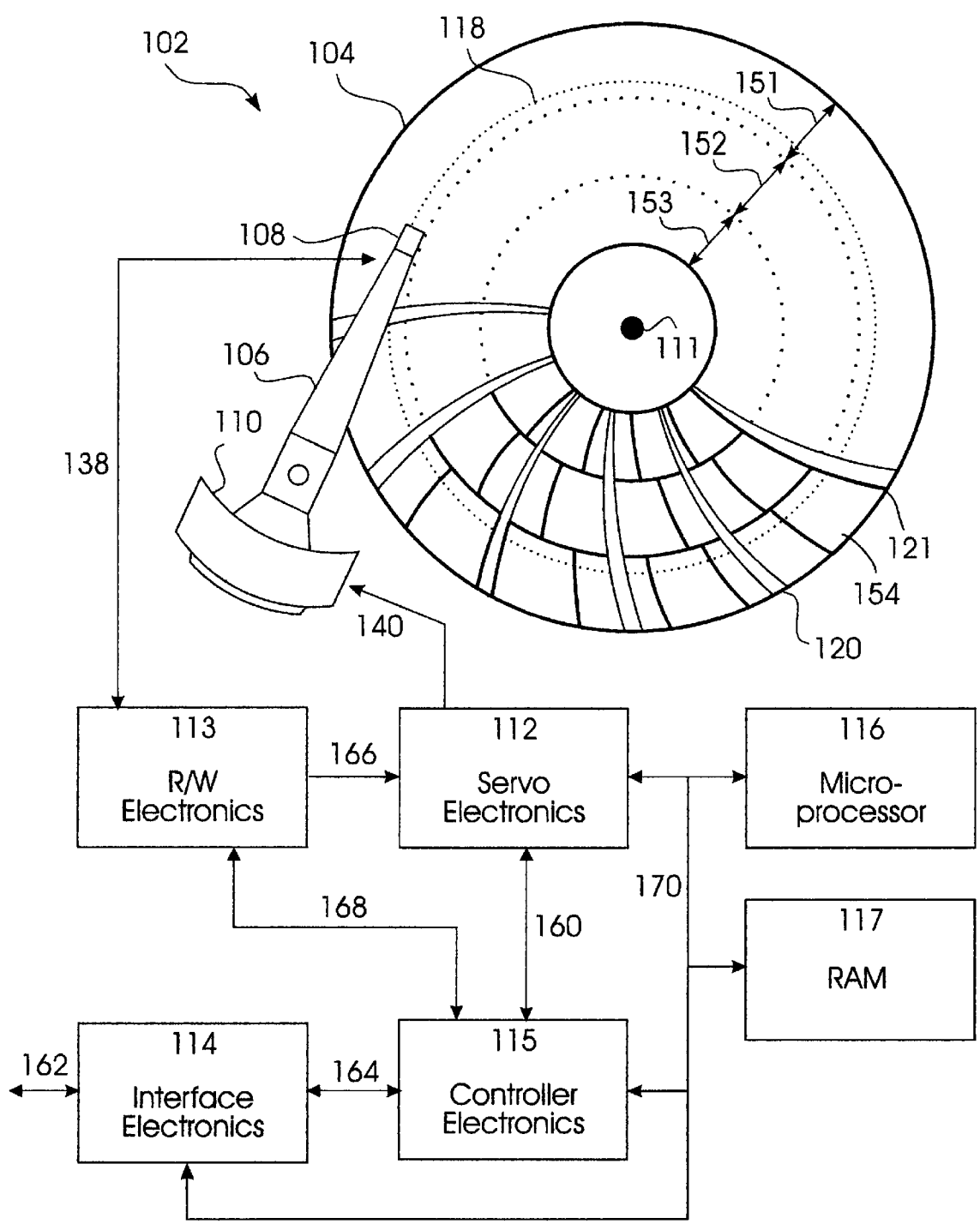
FIG. 1 is a block diagram of a prior art disk drive with a zoned recording, embedded servo, fixed-block architecture and is representative of the type of disk drive capable of incorporating the present invention.

FIG. 1 is a block diagram of a disk drive of the type usable with the present invention. The disk drive depicted is one that is formatted using a fixed-block "headerless" architecture with sector servo and zone-bit recording (ZBR). In ZBR disk drives, the disk is divided into multiple zones oriented in the radial direction. Each zone is comprised of a set of tracks. Since tracks in the outer zones are longer than those in the inner zones, the tracks in the outer zones can store more data than the tracks in the inner zones. Typically, data is stored in sectors, each of which has the same number of data bytes. In this configuration, the additional capacity in the outer zones is utilized by having a larger number of data sectors on each track in the outer zones. This results in the number of data sectors per track varying from zone to zone. IBM's U.S. Pat. No. 5,210,660 describes a ZBR disk drive that has a constant servo sampling rate for all zones by using a single fixed number of servo sectors across the entire disk. The combination of a varying number of data sectors per track and a fixed number of servo sectors per track can result in some of the data sectors being split by servo sectors.

The disk drive, designated generally as 102, includes data recording disk 104, actuator arm 106, data recording transducer 108 (also called a recording head), voice coil motor 110, servo electronics 112, read/write electronics 113, interface electronics 114, controller electronics 115, microprocessor 116, and RAM 117. The recording head 108 may be an inductive read/write head or a combination of an inductive write head with a magnetoresistive read head. Typically, there are multiple disks stacked on a hub that is rotated by a disk motor, with a separate recording head associated with each surface of each disk. Data recording disk 104 has a center of rotation 111, and is divided for head positioning purposes into a set of radially-spaced tracks, one of which is shown at 118. The tracks are grouped radially into a number of zones, three of which are shown as zones 151, 152 and 153. The disk contains a plurality of servo sectors 120, which extend across the tracks in a generally radial direction. Each track has a reference index 121 indicating the start of track. Within each zone, the tracks are also circumferentially divided into a number of data sectors 154. The data sectors contain no data sector identification (ID) fields for uniquely identifying the data sectors so that the drive is considered to have a "No-ID™" brand of data architecture, also called a "headerless" data architecture. In accordance with the normal meaning of "fixed-block architecture", all data sectors are substantially the same size, expressed in bytes of data. However, the present invention may easily be adapted to tolerate some variation in data sector size, such as from 512 bytes per sector to 520 bytes per sector, in the event such a configuration is desirable for a particular implementation. The number of data sectors per track varies from zone to zone, and some of the data sectors do not begin immediately following a servo sector. Further, some of the data sectors are split by servo sectors. If the disk drive has multiple heads, then the set of tracks which are at the same radius on all disk data surfaces is referred to as a "cylinder".

Read/write electronics 113 receives signals from transducer 108, passes servo information to servo electronics 112, and passes data signals to controller electronics 115. Servo electronics 112 uses the servo information to produce a current at 140 which drives voice coil motor 110 to position recording head 108. Interface electronics 114 communicates with a host system (not shown) over interface 162, passing data and command information. Interface electronics 114 also communicates with controller electronics 115 over interface 164. Microprocessor 116 communicates with the various other disk drive electronics over interface 170.

In the operation of disk drive 102, interface electronics 114 receives a request for reading or writing data sectors over interface 162. Controller electronics 115 receives a list of requested data sectors from interface electronics 114 and converts them into zone, cylinder, head, and data sector numbers which uniquely identify the location of the desired data sectors. The head and cylinder information are passed to servo electronics 112, which is responsible for positioning recording head 108 over the appropriate data sector on the appropriate cylinder. If the cylinder number provided to servo electronics 112 is not the same as the track number over which recording head 108 is presently positioned, servo electronics 112 first executes a seek operation to reposition recording head 108 over the appropriate cylinder.

Once servo electronics 112 has positioned recording head 108 over the appropriate cylinder, servo electronics 112 begins executing sector computations to locate and identify the desired data sector. As servo sectors 120 pass under recording head 108, the No-ID™ approach described in U.S. Pat. No. 5,500,848 is used to identify each servo sector. In brief, a servo timing mark (STM) is used to locate servo sectors, and a count of STMs from a servo sector containing an index mark 121 uniquely identifies each servo sector. Additional information is maintained in association with servo electronics 112 and controller electronics 115, and is used to determine whether the present servo sector splits a data sector or whether a new data sector starts immediately following the present servo sector. Further information is maintained in servo electronics 112 and controller electronics 115 that identifies the location of (or the distance to) the start of the next data sector from the present servo sector. Still further information is maintained that identifies the location of (or the distance to) any additional data sectors which begin before the next subsequent servo sector. Still further information identifies the number of the data sector from the index mark 121. This information is used to allow controller electronics 115 to compare the data sector number passing under the recording head 108 with the list of data sectors received from interface electronics 114.

Referring now to FIG. 2, a portion of a typical track 118 on the disk 104 is shown expanded. The index mark 121 indicates the beginning of the track and is thus shown as preceding servo sector 210. Four complete data sectors are shown (201, 202, 203 and 204). Three representative servo sectors 210, 211, and 212 are also shown. As can be seen from this example, some data sectors are split by servo sectors, and some data sectors do not start immediately following a servo sector. For example, data sectors 202 and 204 are split by servo sectors 211 and 212, respectively. Data sector 202 is split into data sections 221 and 222, and data sector 204 is split into data sections 224 and 225. Data sector 203 starts immediately after the end of data sector 202, rather than immediately following a servo sector. Typically, each servo sector begins with an STM, the STMs being the same bit pattern for all servo sectors.

PREFERRED EMBODIMENTS
Operation of the Servo System with the STM Code

FIG. 3 is a detailed view of a portion of a data track, such as the data track depicted in FIG. 2, illustrating the unique set or code of patterns for use as servo timing marks (STMs) according to the present invention. Index mark 121 indicates the beginning of the data track and is the first (STM1) in the set of STM patterns. Other than index, STM2 303 is the second STM in the set and is present in all even-numbered servo sectors to identify the start of even-numbered servo sectors. STM3 313 is the third STM in the set and is present in all odd-numbered servo sectors to identify the start of odd-numbered servo sectors.

Index (STM1) signals the beginning of the track and is thus shown in FIG. 3 as preceding typical servo sector 210. The STM1 is shown in this embodiment as representing the start of a data track, but can be used to represent any unique location on the data track. The servo sector 210 includes a write-to-read recovery (W-R) field 301, a servo sector preamble pattern shown as field 302, a second servo timing mark STM2 303, track identification (TID) field 304 and position error signal (PES) field 305. The W-R field 301 provides time for the recording system to switch from writing data to reading servo information. It also provides timing tolerance for fluctuations in the spindle motor speed, and other effects. The preamble field 302 is shown in this embodiment as an automatic gain control (AGC) field. The preamble field 302 is a constant frequency signal, typically an all "ones" pattern, that is used to distinguish the STM pattern from the prior fields, and is also typically used to adjust the gain of the read amplifier and is necessary for the accurate reading of servo information. The STM2 303 is a timing alignment mark that provides an accurate reference point that identifies the beginning of an even-numbered servo sector, and is used to locate the subsequent servo information that follows i.e., it allows the servo system to read the TID field 304 and the PES field 305. The STM2 303 is also used to provide timing for locating data sectors, to help locate subsequent servo sectors, and to assist in error handling. The TID field 304 contains information on the coarse head location, including such information as the track number, servo sector number, and head number. The track number changes from track-to-track, and is typically encoded using a Gray code. The PES field 305 contains very accurate radial position information that is used to precisely align the head for read and write operations. The succeeding servo sector 211 is identical to servo sector 210 except that the STM3 313 is the third pattern (STM3) in the set of STM patterns, and is used to identify servo sector 211 as an odd-numbered servo sector. Thus, as shown in FIG. 3 and as will be explained in detail below, there are three unique STMs that are used to time the servo system and together form a set or code of patterns.

Figure 4:
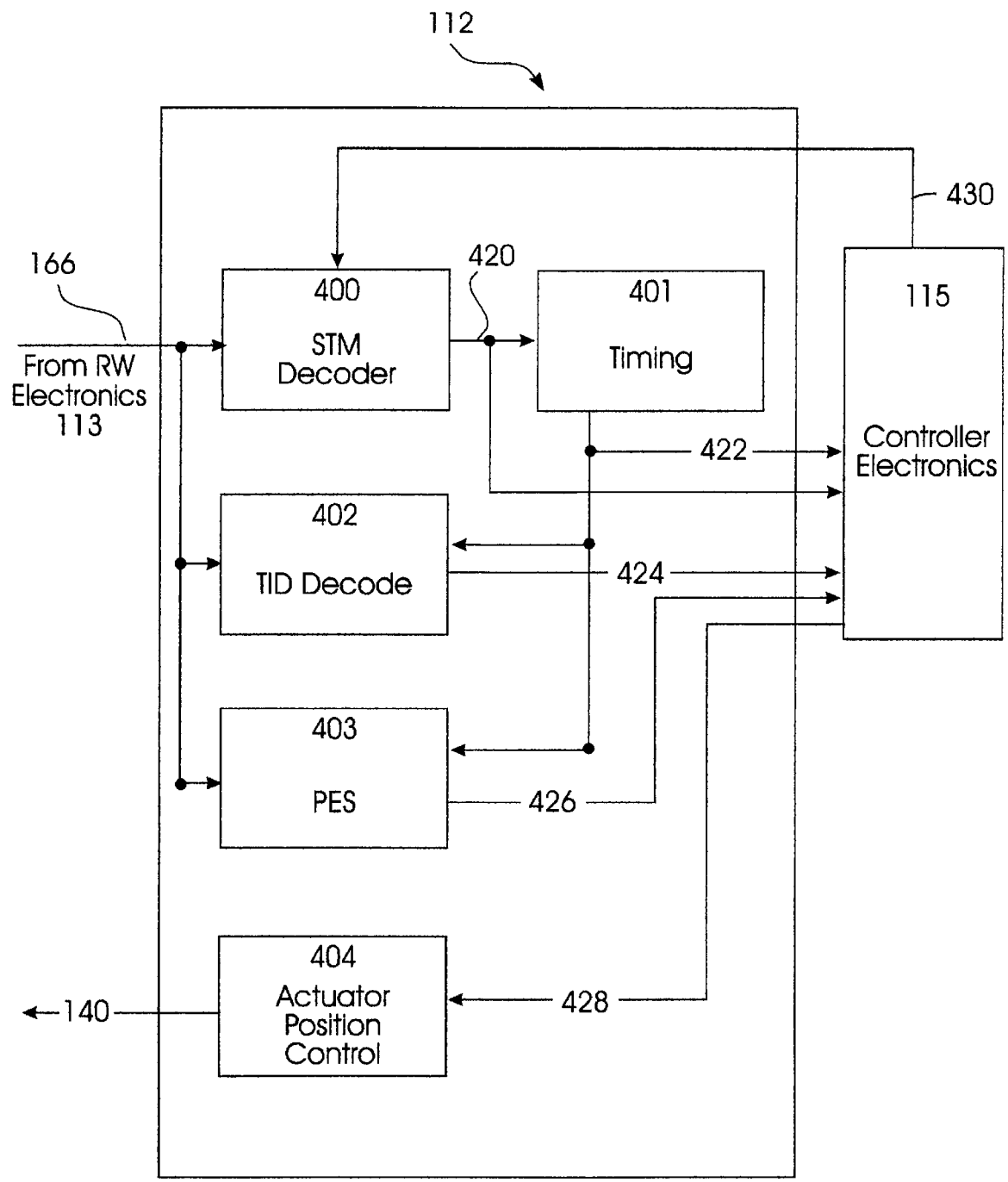
FIG. 4 is a block diagram of the servo electronics, including the STM decoder, of the present invention.

FIG. 4 is a detailed block diagram of the servo electronics 112. In operation, controller electronics 115 provides input to actuator position control 404, which in turn provides a signal 140 to the actuator to position the head. The controller electronics 115 uses the servo information read from the servo sectors to determine the input to the actuator position control. The servo information is read by the read/write electronics 113 (FIG. 1), and signals 166 are input to the servo electronics 112. STM detector 400 receives a clocked data stream as input from the read/write electronics 113, and a control input 430 from the controller electronics 115. Once an STM has been detected, an STM found signal is generated. The STM found signal 420 is used to adjust timing circuit 401, which controls the operating sequence for the remainder of the servo sector. STM found signal 420 may also be sent to controller electronics 115. Each of the three STMs is a bit pattern that is distinct from the preamble field 302 (FIG. 3). The detailed operation of STM detector 400 to detect and decode all the STM patterns is described in detail with respect to FIG. 7. After detection of the STM, the TID decoder 402 then reads the clocked data stream 166, which is typically Gray-code encoded, and passes the decoded TID information 424 to controller electronics 115. Subsequently, PES decode circuit 403 captures the PES signal from read/write electronics 166, then passes position information to controller electronics 115. Inputs to the PES decode circuit 403 are typically analog, although they may be digital or of any other type. Also, the PES decode circuit 403 need not reside within the servo electronics module 112.

The Need for Accurate STM Detection

Accurate detection of the STMs is required to recognize servo information, such as the TID field 304 and PES field 305, and is necessary for closed-loop actuator control.

Further, STM detection is used to generate sector pulses needed to read or write data sectors that are located between the servo sectors. STMs, therefore, play a critical role in the operation of the disk drive. Prior disk drive servo systems relied on detecting the STM in the presence of some errors. These methods included transitionless recording gaps in which the detection circuitry allows a fixed number of errors within a fixed spacing, and redundant STM bit patterns placed adjacent to each other that are decoded individually or by majority voting. These methods are not format efficient and are inferior in correction capability.

When a sufficient number of STM bits are in error, it is not possible for the servo electronics to detect the STM. This results in the TID and PES information, which follow the STM in the servo sector, being missed as well. When a servo sector is not recognized, the servo system will generate servo timing information based on the previous STMs. However, servo tracking and timing accuracy will be diminished. There is a limit on the number of consecutive STMs that can be missed before timing and positioning uncertainties become unacceptably large.

Error conditions which cause the servo electronics to incorrectly detect an STM at the wrong location are also possible. The occurrence of a false STM is more problematic than a missed STM. A false STM can cause incorrect data to be sent to the TID and PES decoders, resulting in missed or incorrectly interpreted TID and PES. False STMs have varying consequences on disk drive performance and data integrity. For instances when the measured TID and PES values differ greatly from expected values, the servo system will ignore the offending values. This will still affect file performance because there are fewer valid servo sectors for maintaining the head on track and seeking between tracks. The most difficult error conditions to correct are those in which the disk drive does not ascertain an error condition in the STM. This type of error occurs when the STM is located within the desired timing window, but in the wrong location. The resulting subtle gating variation may produce a small PES error, and hence a small tracking error, which directly affects the disk drive's ability to retrieve data. Additionally, because succeeding STMs are located using this erroneous STM, accuracy and probability of locating succeeding STMs are diminished. Accuracy also impacts the placement of data with respect to servo sectors around a track so that there is a possibility that portions of servo sectors, or different data sectors, may be overwritten by data when a premature indication of a servo sector is posted by the STM.

Correct identification of the index STM (STM1 in FIG. 3) is also important because locating servo sectors and data sectors in a headerless architecture disk drive begins with the identification of the index STM. Typically, information which identifies the index servo sector (i.e., the first servo sector on the track) is encoded within the TID region, but may also be encoded in the STM. Unique information to data track, zone, head, etc. may be placed within or relative to the index servo sector. An index STM robust to errors, that is reproducibly and accurately decoded, is thus crucial in achieving rapid and accurate data recovery.

The STM Code

In the present invention, error-tolerant STMs are achieved by the use of a set or code of fixed STM bit patterns, where the STM patterns have a specified minimum Hamming distance against all the patterns in the search, called the sliding distance d. The Hamming distance between two patterns refers to the number of bits which are different in the two patterns. Operationally, it is the number of ones in the pattern resulting from the exclusive OR'ing of two input patterns. The sliding distance for a set of patterns determines its error correction powers.

These STM patterns may include any bits associated with the servo sectors. The pattern evaluation process begins with serial bits, output from the R/W electronics, being converted to parallel bytes. A shift register of length n is used for storing an STM pattern of n bits in length. Each shift creates new patterns which, when compared to the fixed STM bit patterns, form the basis of the code. The concept of sliding distance describes the behavior of the patterns when viewed through this shift register. The shift register can be thought of as a window that slides along the input data. Error correction/detection capability of the STMs depends on maintaining a minimum distance between the shift register contents and the fixed STM pattern. Valid STMs are recognized when the sliding distance between the repeating preamble pattern (which is typically a ... 11111 ... pattern) and the STM patterns are within predetermined limits defined by the power of the code. (Unless specifically stated, the rest of this description will assume this preamble pattern.) To describe how these limits are determined, code dependencies are defined in terms of the following parameters:

d=sliding distance between STM patterns in the code,
s=number of correctable errors, and
t=number of detectable errors.

The error correcting and detecting properties are determined from the sliding distance d, as defined by:

$$d \geq 2s+t+1 \qquad \text{(Eq. 1)}$$

If the distances obtained during the process of shifting in the bit patterns are greater than the distance d for all but the desired location, then it becomes possible to correct or detect errors. Specifically, if a set of patterns has a sliding distance d between all patterns in the set, then the code can correct up to s errors and detect up to t further errors. For example, a code with d=7 can correct a maximum of 3 bits in error (0 bits for detection) or detect a maximum of 6 bits in error (0 bits for correction). Thus, it is possible to tradeoff error correction power for error detection power, within the limits defined by Eq. 1. The maximum correction power of code of patterns is then defined by the following:

$$s = \frac{d-1}{2} \qquad \text{(Eq. 2)}$$

Thus, an optimal STM code design may require that part of the detection power be sacrificed for correction, or part of the correction power be sacrificed for detection, as will be described below with respect to the adaptive features of the invention. Also, the error-tolerant STM patterns in the code not only assure a reliable indication of the beginning of servo sectors, but also provide an indication of the disk drive's health. Because part of the detection process requires that the number of bits in error be monitored, bit errors monitored over time may be used for predictive failure analysis of the disk drive. This information can allow the user to take corrective action, such as backing up of data.

To explain the generic STM code for use in the disk drive of the present invention, consider a repeating pattern preamble p, such as p= ... 1111 .... The STM code C is said to be a code of size m, length n, and sliding distance d if $$C = \{u[0], u[1], \ldots, U[m-1]\}$$

where each [i] is a pattern of length n, and the Hamming distance between u[i] and any pattern obtained by sliding a window of length n over the bitwise concatenation (p,u,[j] is at least d, except in the case in which the slid pattern is u[i] itself, in which case the distance is 0. That is, there are m patterns in the code C. When a given pattern u[i] in the code is compared against all shifts of the input stream, it maintains a distance of at least d against all the shift patterns other than where this pattern is expected. This code C is denoted as an (n,m,d) code. For burst errors, to be described below, the burst length b is an additional parameter. Burst codes are designated with the notation (n, m, d: b). Note that notationally (n,m,d)=(n,m,d: 1). The sliding distance d determines the error tolerance of the code. When dealing with burst errors, the sliding distance is replaced with the burst sliding distance for the burst length b under consideration.

By way of example, consider the following code:
C={0000010, 0010111}

In this example, each pattern is 7 bits in length, there are 2 patterns, and the sliding distance is 3. Thus, C is a (7,2,3) code. It is clear that the two patterns are at a distance 3 from each other, i.e., there are 3 bits which are different between the two patterns (a necessary condition, but not sufficient as will be defined below). FIG. 5A is a table that shows the input data pattern with pattern 1 (e.g., STM1) concatenated with the preamble in the top row for this (7,2,3) code. The other rows show the pattern 1 pattern at different shift locations. The contents of the shift register are those cells in the top row that have an entry in a lower row at some shift position. The left-hand column shows the Hamming distance between the pattern in the shift register and the search pattern. The bits where the shift pattern differs from the pattern are highlighted for ease of viewing. For this example, note that except for a shift of 0, the minimum Hamming distance encountered is at least 3. Therefore, this (7,2,3) code can correct single bit errors, or detect up to 2 error bits when no correction is attempted (d=3). Correcting single bit errors can be achieved by detecting when the Hamming distance between the shift register and the search pattern is 0 or 1. Detecting up to 2 errors can be achieved when the Hamming distance is 1 or 2 (a pattern is considered found only when the distance is 0). To show that this code meets the d=3 criterion, the three other cases must be examined. These are when the input pattern is pattern 2 (e.g., STM2) and the search pattern is pattern 2, when the input pattern is pattern 1 and the search pattern is pattern 2, and when the input pattern is pattern 2 and the search pattern is pattern 1. The last case is shown in the table of FIG. 5B. The other cases produce similar results. Since in this code example there is a sliding distance of d=3 for all search/shift combinations (excluding the desired matches), this code can correct all single bit errors (s=1), as shown by Eq. 2.

A code with two patterns (m=2), as in the above example of a (7,2,3) code, may not be sufficient for some applications. The price for increasing the size of the code or the correction power is a larger value of n (longer STM patterns). The following are suggested uses for codes of different sizes. Of course, there are other possibilities, and the potential exists for code sizes larger than m=5. A method for generating such codes and a decoding algorithm are described below.

m=2: Index and one nonindex. Now the index is robust to d also.
m=3: Index and two nonindex. The two nonindex can be 1 bit of servo sector number (as in FIG. 3 to handle even- and odd-numbered servo sectors), or 1 bit of head number.
m=4: Index, alternate index, and two nonindex. Alternate index defines another sector location at index that may be used when the previous index is missing.
m=5: Index and four nonindex; e.g., 2 least significant bits (LSB) of servo sector number.

In the present invention as described with respect to the track portion shown in FIG. 3, the three STM patterns (STM1 for index, STM2 for even-numbered servo sectors, and STM3 for odd-numbered servo sectors) are three unique patterns in an STM code defined as an (n,m,d) code of (16, 3, 7), where m is the number of STMs in the code. The bit length n of the STM patterns is tailored according to the bit failure mechanism and the number of patterns desired. Typical failure mechanisms include bit shift, single bit, burst, etc.

While each STM pattern may be recorded on the disk in the exact pattern of bits corresponding to the STM pattern, this is not necessary so long as whatever pattern or sequence of magnetic transitions that is recorded on the disk can be uniquely deciphered into the corresponding STM pattern for presentation to the STM decoder. Thus each STM recorded on the disk is merely representative of a pattern of n bits of digital information.

STM Code Generation

The STM codes described so far, and those listed in the tables below, were generated by a search algorithm on a computer. The search algorithm tests input patterns to find sets which meet the target distance. One code generation algorithm is shown as follows:

1. Choose n, d, find code with maximum m.
2. Test all n bit patterns v[i], $0 \leq i < 2^n$ for sliding distance d when concatenated with preamble pattern p. If a pattern meets or exceeds the sliding distance d, it is added to the list of elements. This produces a list w[1][i], $0 \leq I < k$ of all the m=1 codes, where k is the number of elements in the list. If k=0, there is no such list.
3. Test for codes with m=m+1 elements. For each code in the code list for the previous value of m, attempt to extend the code by 1 element using codewords from the m=1 list. The code is extended when sliding distance is met between all elements, including cross terms. Specifically, for each code from the prior list, u[m-1][j], $0 \leq j < m-1$, attempt to add an element u[m-1][m-1]=$w_j$. Test sliding distance of all m elements of the list against the concatenation of each element in turn with the preamble pattern p. If all tests meet or exceed the sliding distance d, then the code being tested is added to the list of codes w[m][i], $0 \leq i < k$. If k=0, there is no such list.
4. Repeat step 3 for the next value of m until k=0 for some value. The result will be lists of all (n, x, d), $1 \leq x \leq m$, STM codes.

It is possible to modify the above algorithm (shown below) to change the criterion from the sliding distance to some other distance, for example, the sliding burst distance. There may be cases where a decoder in the electronics converts single bit errors on the disk to 2-bit errors in the datastream. Therefore, a code which handles such bursts would be desirable.

The following are specific examples of codes that correct independent bit errors, generated using the above algorithm. These are the most general codes, since they place no restrictions on the locations of the errors. It can be readily verified that the following is an (8,5,3) code.

C={00000010, 00010111, 00011001, 00101000, 01001111}

Similarly, the following is a (10,5,4) code.

C={0000001001, 0001000111, 0001101100, 0010110101, 0010111010}

Finally, the following is a (12,5,5) code.

C={000011101001, 000100011000, 000100110111, 001010000010, 001011010101}

Table 1 below lists a set of the optimum STM codes for various n, m, and d values for independent bit errors. For each choice of a sliding distance d, and a number of codewords m, we find a minimal length n. That is, the tables state that there is an (n, m, d) code, but not an (n, m+1, d) code. A value of "." implies that the code has not been measured. Values noted with an "*" are upper bounds on n, and indicate that there may be a shorter code.

TABLE 1

Length of Code n for STM Codes with Sliding Distance d and m Code Patterns

| d | m = 1 | m = 2 | m = 3 | m = 4 | m = 5 |
|---|---|---|---|---|---|
| 3 | 5 | 7 | 7 | 8 | 8 |
| 4 | 7 | 8 | 9 | 10 | 10 |
| 5 | 9 | 11 | 11 | 12 | 12 |
| 6 | 11 | 13 | 13 | 14 | . |
| 7 | 12 | 15 | 16 | 16 | . |
| 8 | 14 | 17 | 17 | . | . |
| 9 | 16 | 18 | 19 | . | . |
| 10 | 18 | 20 | . | . | . |
| 11 | 20 | . | . | . | . |
| 12 | 22 | . | . | . | . |
| 13 | 24* | . | . | . | . |
| 14 | 27* | . | . | . | . |

Optimum STM burst codes for handling burst errors have also been generated. The sliding distance of steps 2 and 3 in the code generation algorithm above is replaced with the sliding burst distance. Each burst (of up to the burst length) is treated as a single error event for the purpose of computing the Hamming and sliding distances. FIG. 6 shows the detection process for a (7, 1, 3: 2) code. This code has 1 pattern which is 7 bits long, and has a sliding distance of 3 for 2-bit bursts. Therefore, it can correct up to one 2-bit burst. The left-hand column of FIG. 6 lists the 2-bit burst distance between the shift pattern and the STM pattern. The 2-bit bursts are highlighted in each row to help clarify the errors. Note that a burst may have fewer errors than the burst length.

The following is a (9, 4, 3: 2) code, which can correct up to a 2-bit burst error.

C={1000010001, 010000011, 010010110, 010111001}

The following is an (11, 4, 3: 3) code, which can correct up to a 3-bit burst error.

C={00000010001, 00101000011, 01100100111, 01101111010}

Table 2 below are tables for burst error STM codes. The tables are arranged by sliding distance d. Within each table, the first column lists the maximum burst length, and the following columns are arranged according to the number of patterns m. Each entry is the number of bits in the STM pattern n, which are required for the code. That is, Table 2 states that there is an (n, m, d: b) code, but not an (n, m+1, d: b) code.

TABLE 2

| Burst length b | m = 1 | m = 2 | m = 3 | m = 4 |
|---|---|---|---|---|
| Some of the Optimum STM Burst Error Codes, When d = 3 | | | | |
| 2 | 7 | 9 | 9 | 9 |
| 3 | 9 | 10 | 11 | 11 |
| 4 | 11 | 12 | 13 | 13 |
| 5 | 13 | 14 | 15 | 15 |
| 6 | 15 | 16 | . | . |
| 7 | 17 | 18 | . | . |
| 8 | 19 | 20 | . | . |
| 9 | 21* | . | . | . |
| 10 | 23* | . | . | . |
| 11 | 25* | . | . | . |
| 12 | 27* | . | . | . |
| Some of the Optimum STM Burst Error Codes, When d = 4 | | | | |
| 2 | 10 | 11 | 12 | . |
| 3 | 13 | 14 | 15 | 15 |
| 4 | 15 | . | . | . |
| 5 | 18 | . | . | . |
| 6 | . | . | . | . |
| 7 | . | . | . | . |
| 8 | 27 | . | . | . |
| Some of the Optimum STM Burst Error Codes, When d = 5 | | | | |
| 2 | 12 | 14 | 15 | 15 |
| 3 | 16 | 18 | . | . |
| 4 | 20 | . | . | . |
| 5 | 27* | 27* | . | . |
| Some of the Optimum STM Burst Error Codes, When d = 6 | | | | |
| 2 | 15 | 17 | 18 | . |
| Some of the Optimum STM Burst Error Codes, When d = 7 | | | | |
| 2 | 18 | 20 | . | . |

*Partial search, this is an upper limit on n.

Decoding Circuitry for the STM Code

Figure 7:
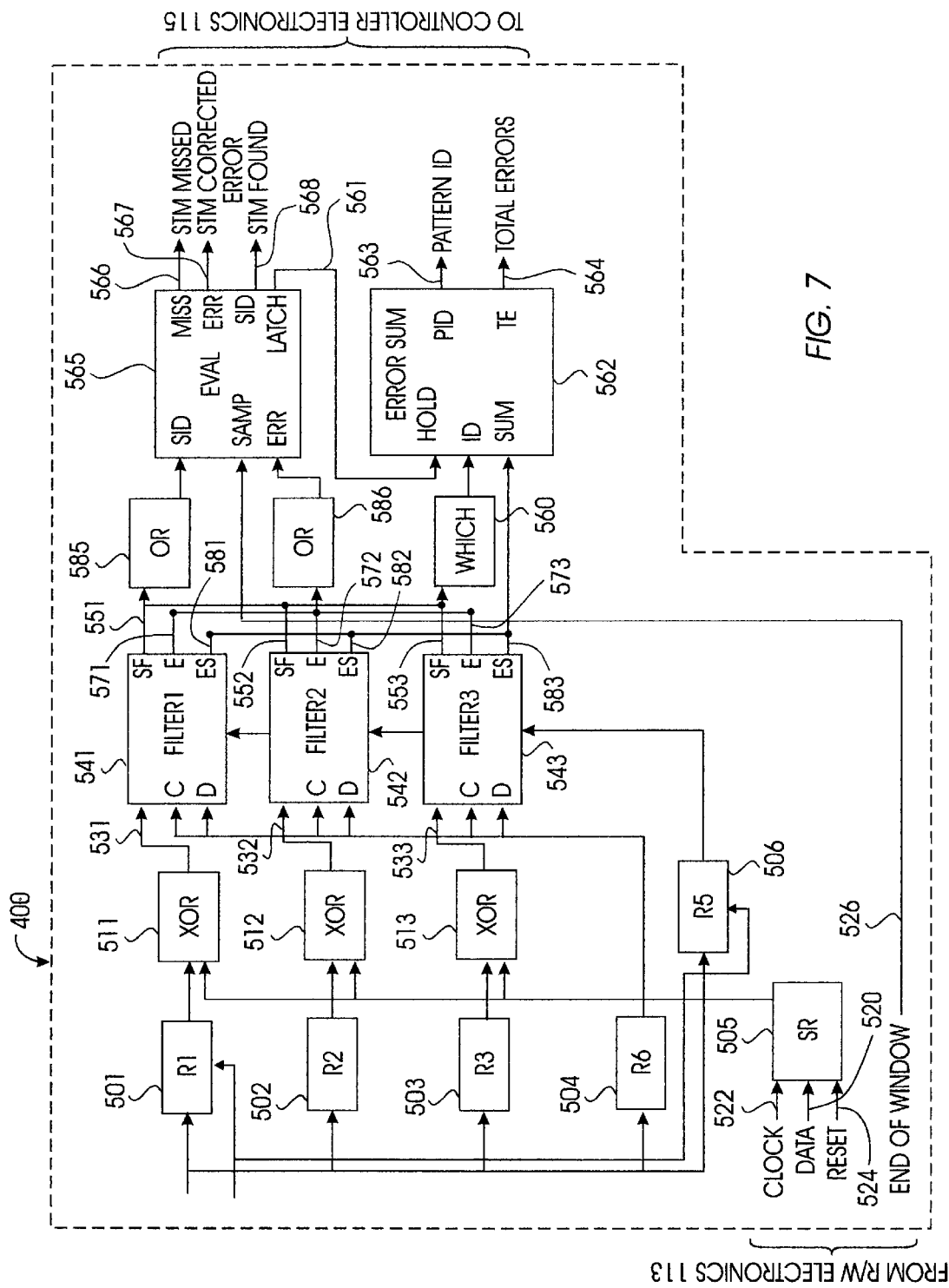
FIG. 7 is a detailed block diagram of the STM decoder of the present invention.

FIG. 7 is a circuit block diagram of STM decoder 400 having error correcting and detecting properties for use with the STM code shown in the track portion of FIG. 3. The detection process begins with a reset pulse 524 to shift register 505. Reset pulse 524 preloads the shift register 505 with the preamble pattern. With each clock transition 522, serial data bits 520 output from the R/W electronics 113 (FIG. 1) are converted to n parallel bits 528 using shift register 505. With each shift, n bits 528 output from the shift register 505 are exclusive OR'ed (XOR'ed) at 511, 512, and 513 with fixed bit patterns STM1, STM2, and STM3 stored in pattern registers 501, 502, and 503, respectively. Filters 541, 542 and 543 receive the XOR outputs 531, 532, and 533, respectively, and compare them to the value 534 stored in code power register 504. An STM found indication 551,552, or 553 will appear at the output of filters 541, 542, or 543, respectively, if the number of bits in error 531, 532, or 533, respectively, are within the error correction power 534 stored in the code power register 504. STM pattern identification is qualified at 562 and a signal output 563 reported to the disk drive controller electronics 115 (FIG. 1) as the specific identified STM pattern. The indication that bits were in error is flagged at 571, 572, and 573, respectively, and the total number of errors are logged at 581, 582, and 583, respectively. The logged total errors for the detected STM are decoded at 562 and sent as signal 564 to the controller electronics 115. Timing pulse 561, derived from evaluation circuitry 565, determines when the pattern ID and error sum are valid. Additionally, indications that an STM was found are gathered in OR gate 585 and indications that errors were found are gathered at OR gate 586. The outputs of OR gates 585 and 586 are sent to evaluation circuitry 565 for qualification. Signals indicating STM missed 566, STM corrected error 567, and STM found 568 are passed to the controller electronics 115 only if they occur within the valid timing window defined by reset signal 524 and the end of window signal 526.

In many cases, it is desirable to preload the shift register 505 with the preamble pattern. In this example, the preamble is an all ones pattern so the shift register is preloaded with a 1 in each shift location. Therefore, the number of bits needed in the preamble field is not required to be at least as long as the STM pattern. The number of bits needed in the preamble window is then determined by the timing accuracy of the reset pulse 524. Storage capacity is thereby increased since fewer bits are needed for the STM function. This approach has the further advantage of increasing the tolerance of timing errors. For example, if the STM detector is configured to correct 2 bits in error, then it is possible to correctly locate the STM when the reset pulse occurs up to 2 bits into the STM pattern itself, assuming there are no further errors.

A decoding algorithm for use by the decoding circuitry of FIG. 7 is detailed below. The algorithm allows for correct identification of the STM patterns when an (n, m, d) code C is used. There is a tradeoff between error correction and error detection, as shown in Eq. 1 above. Let $u[0], [1], \ldots u[m]$ be the codewords (STM patterns) in C, and p the repeating pattern (the preamble pattern). Assume that r is a received (possibly with errors) version of the stored sequence p, u). The decoder keeps shifting a window of length n over r. For each shift, it makes one of three possible decisions.

Let v be a pattern obtained by sliding a window of length n over r, and let $l[j]$ be the distance between each $u[j]$ and v, $0 \leq j \leq m-1$. Then, there are three possible decisions:

1. If $l[j] \leq s$ for some j, then the STM pattern is $u[j]$.
2. If $s+1 \leq l[j] \leq s+t$ for some j, then declare an uncorrectable error, which is an STM error (prevents incorrectly finding an STM in the wrong place due to errors).
3. If $s+t+1 \leq l[j]$ for each j, $0 \leq j \leq m-1$, then continue to the next shift location.
4. Finally, if the end of the timing window is reached without finding an STM or an uncorrectable error, the result is a missing STM.

The second step in the algorithm above is omitted when $2s=d-1$, where the algorithm is used for correction only. The procedure can correctly determine the STM pattern from the read back pattern even in the presence of s errors. Moreover, if more than s errors occur, but no more than s+t, these errors will be detected, and misidentification cannot occur.

For example, consider the following (10, 5, 4) code:

C={0000001001, 0001000111, 0001101100, 0010110101, 0010111010}

Figure 8A:
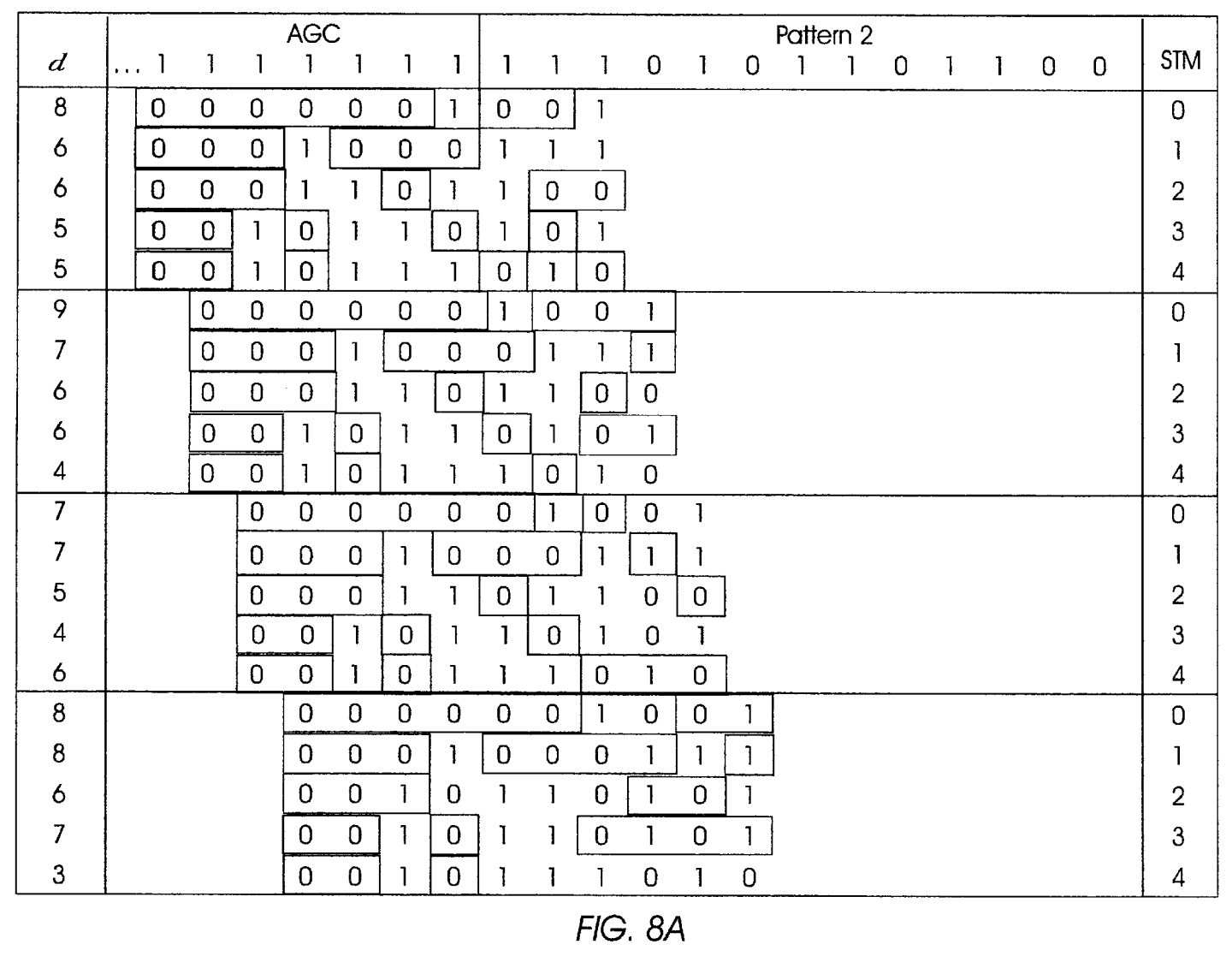
Figure 8B:
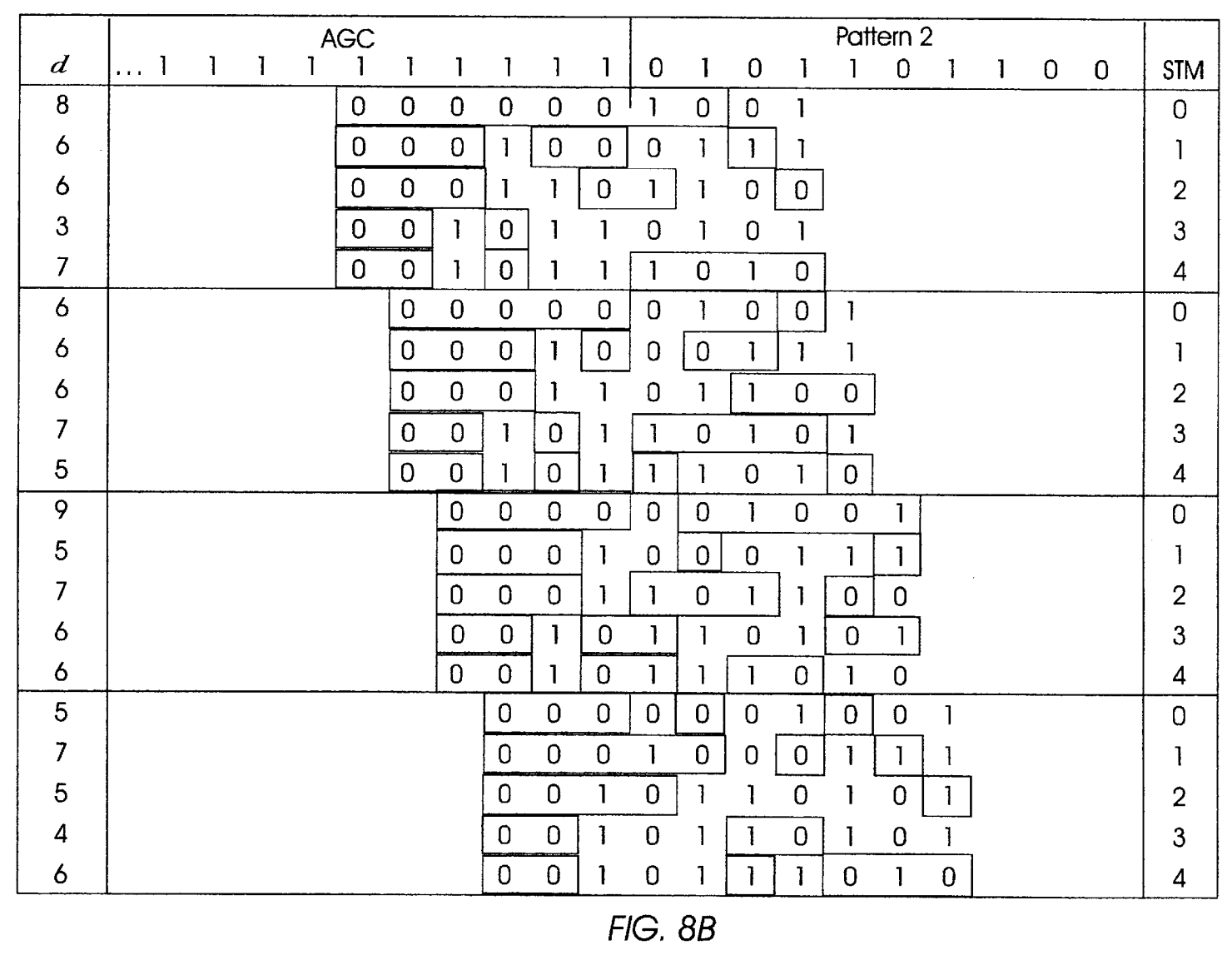
Figure 8C:
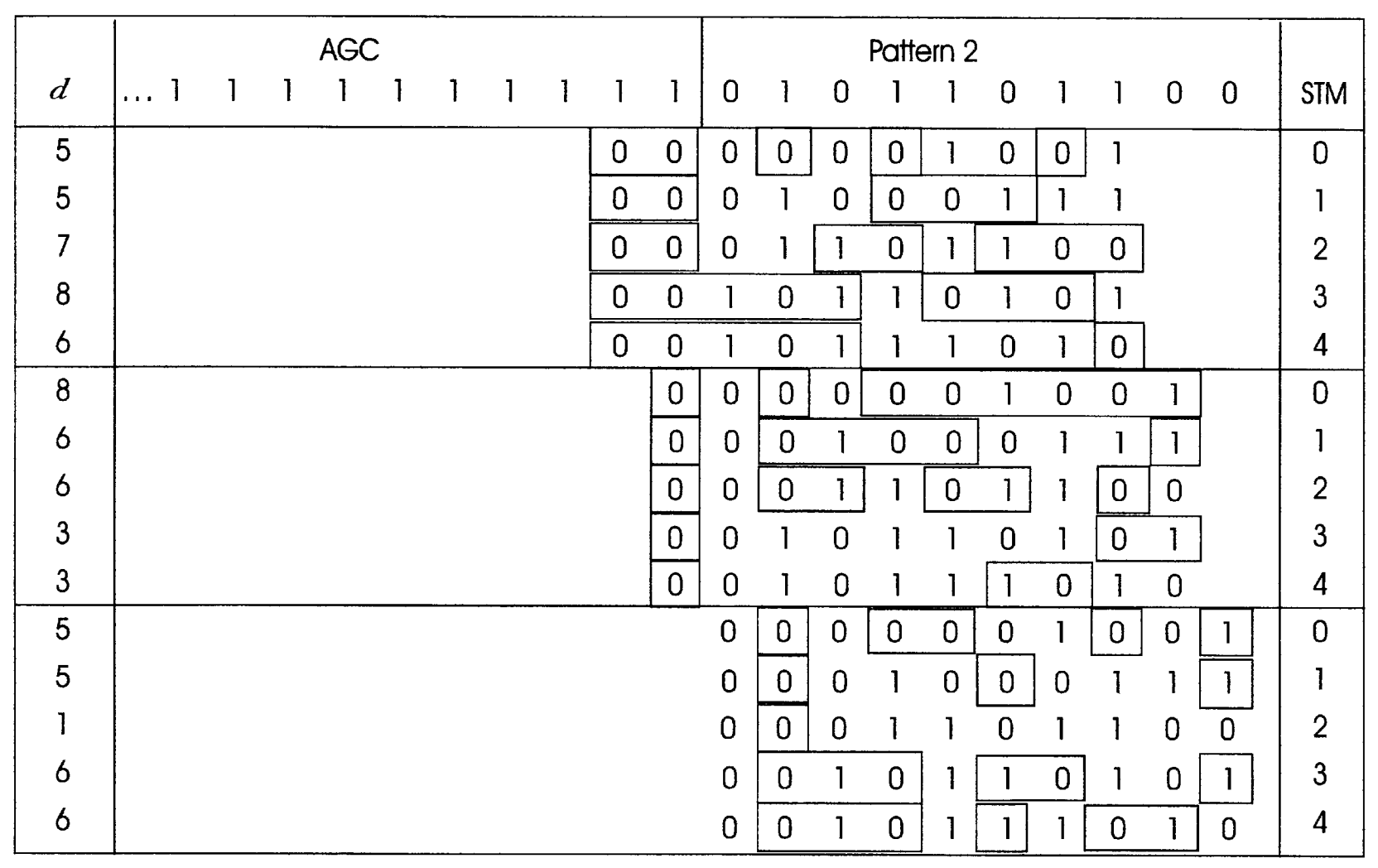

Here d=4, so from Eq. 1 we can choose S=1 and t=1, therefore C can correct one bit in error and detect 2 bits in error. That is, there are 5 STM patterns and all patterns with a single bit in error are corrected, i.e., correctly identified even in the presence of a single bit error, and all patterns with 2 bits in error are detected. Given that the preamble pattern (FIG. 3) immediately preceding the STM is . . . 1111 . . . , and that the expected read back STM pattern (0001101100) contains a single bit in error (shown underlined below), an error pattern of r=. . . 1110101101100 is read. To recognize this single bit error, the decoding algorithm slides a window over r and measures the distance to each pattern in the code. It keeps shifting while these distances are at least 3, and it halts when the distance is 0, 1, or 2. Identification occurs when the distance to a pattern is either 0 or 1. Error detection occurs when the distance to a pattern is exactly 2. This is illustrated explicitly in FIGS. 8A–8C. The distance values are shown in the left-hand column. At each shift, all 5 STM patterns are compared against the input. The right-hand column lists the STM number.

Burst Code Decoder

It is possible to generate the logic for the general case of burst length b and code length n. One method is to use a counter which counts the errors. It starts at the LSB, and each bit is examined in turn. If a 1 is encountered, the counter is incremented, and then examination skips over b bits (skips the burst) and continues examining. This decoder is most useful when a high-speed clock is available to minimize the delay in computing the burst count. If it takes longer than 1 bit time to compute the burst count, multiple pipelined counters would be used. It is also possible to use combinatorial logic to count the bursts. In this case, the first stage of adders of the independent bit error decoder is replaced by a burst code detector. The bust code detector stage will have n/b outputs, with an additional output if n is not a multiple of b. These outputs are then added together to get the burst count. The general burst detector logic is that a 1 encountered in an error pattern is counted as a burst if it is not in a prior burst. The general logic equations are shown below.

$x[i]$=bit i of the input vector x, $0 \leq i \leq n-1$, $w[i]$=indicates whether a burst of size b starts at bit i, i.e., unless $w[i]=1$, a burst of size b will not start at i.

$d_b$=total burst count, i.e., sum of $w[i]$'s.

$$w[i] = x[i] \odot \prod_{k=1}^{b-1} \overline{w[k+i-b]} \qquad \text{(Eq. 3)}$$

$$d_b = \sum_{i=0}^{n-1} w[i]$$

course, it is possible to achieve the same function using different logic configurations.

The following example will show how Eq. 3 may be used to determine burst distance $d_b$. This example assumes that n=6, b=2, and the input is the vector 110010.

$w[0]=x[0] \odot w[-1]=1,$ $w[1]=x[1] \odot w[0]=0,$ $w[2]=x[2] \odot w[1]=0,$ $w[3]=x[3] \odot w[2]=0,$ $w[4]=x[4] \odot w[3]=1,$ $w[5]=x[5] \odot w[4]=0,$ $d_b=w[0]+w[1]+w[2]+w[3]+w[4]+w[5]=2$ Programmable Hardware Therefore, there is a balance to be struck between performance and reliability. Typically, the level of correction will be chosen such that the probability of more errors than can be corrected or detected is acceptably low. This, of course, depends on the error rate. The hardware may be made adaptive for this operation by allowing the error correction and error detection comparison values to be updatable, such as by a programmable register (item 504 in FIG. 7). This will allow the manufacturer to set the value at any time, such as during manufacture. For example, during the early phases of a manufacturing program, it is likely that the error rate may be higher than it would be for a mature program. It may therefore be beneficial to have a lower correction level (hence higher detection level) during the early phases of manufacturing to increase the yield. Once the process is better controlled, the level of correction could be increased, providing a performance boost at the same time. It is also possible for the drive to determine the appropriate settings during operation by testing its performance.

Given the nature of the codes, it may also be desirable to have the choice of specific code be programmable as well. This may be accomplished by storing each of the STM patterns in registers (501, 502, 503 in FIG. 7). It is also possible to design hardware wherein the length of the code is also adjustable. Programmable registers would be used to set the length of the shift register and the widths of the decoder chains. This provides great flexibility for the designer. This is especially useful for OEM vendors, since they need to allow great flexibility for their customers to choose the STM properties.

Programmable Correction Power

It is possible for a disk drive to use the distance values obtained during STM search operations to make an approximate measurement of the error rate. This will allow the drive to determine whether the current correction level is appropriate. Specifically, each STM code has a sliding distance specification, and the electronics determines which STM was found by computing the distance of the shift register contents from each of the STM patterns. When there are no errors, the minimum distance will be 0 for only one pattern. However, if there are errors, the minimum distance may be nonzero. When an STM error is corrected (i.e., an STM with an error correctly identified so that an STM found signal is generated), the assumption made is that the distance value is equal to the actual number of errors. Therefore, counting nonzero distance values which were corrected gives an estimate of the occurrence rates for those errors. This is not a precise measurement since STMs can still be found at distance 0 even with a single bit error (e.g., in the preamble field), and if the number of errors exceeds the detection span, it could also result in a distance of 1. When the STM search halts by detecting more errors than can be corrected, the number of errors may be estimated by the value of s+1. It is not possible to ascertain the actual number of errors, but s+1 represents the most likely number of errors. If the STM search ends without detecting the STM or halting due to error detection, then the number of errors may be estimated by s+t+1. Again, this is the most likely number of errors.

It is possible to design the STM detector to record such events. For example, consider the (12, 5, 5) code, with the correction level set at s=1, and the detection power set at t=2. The number of single bit errors can be estimated by counting the number of STMs corrected with a distance of 1. The number of 2-bit errors is estimated by counting the number of STM searches halted for detected errors. The number of 4-bit errors is estimated by counting the number of STM searches which ended without finding the STM or halting for error detection. Counting may be accomplished by hardware counters or in software by making the distance values available to the microprocessor, such as through a register. Once an error rate estimate has been arrived at, it may be used to adjust the correction level. Such a determination can be as simple or complex as needed. For example, a simple criterion for adjusting the level is to look at the error detection rate. If the number of errors detected at the highest levels is below some threshold after a given number of STM operations, the correction level could be increased. (Note that for each error desired to be corrected, the detectability of two errors is given up.) Similarly, if the number of errors corrected at the highest level exceeds some threshold after a given number of STM operations, then the correction level may be determined to be too high if there is no further detection, or deemed too low if there is more correction power available. More complex algorithms are clearly possible, including effects such as head location. For example, a given head, track, or sector may have a higher error rate than the average for the drive, and the levels could be adjusted accordingly. Since servo sectors tend to be spaced at long-time intervals compared to electronics speeds (e.g., 100 microseconds apart), it is possible to adjust the correction power between successive servo sectors, if desired. Further, the adaptive algorithm can be designed in hardware, software, or a combination of the two.

The error rate information obtained in this fashion can be put to many uses. First, it may be used to map the error rate on the various surfaces to determine the appropriate correction and detection levels at specific locations. Second, it may be used for predictive failure analysis (PFA). For PFA, the time evolution of the error rate information is used, possibly including location. For example, if the error rate is seen to increase beyond a certain threshold, or the number of regions at some error rate is above a threshold, then a likely failure may be predicted. The advantage of using error rate information from the STMs is that the information may be gathered continuously, without need to take the drive offline. It may also be used to aid in localized failure prediction. These are failures which the drive can recover from. For example, if the underlying error rate for an STM area increases, it may be wise to relocate the associated data sectors while the STMs are still readable. This sector could then be avoided, without future loss of customer data should the STMs fail entirely.

Programmable correction power is also useful for error recovery. An error recovery procedure could choose to adjust the correction and detection levels as appropriate to try and recover an STM. This could be changed through various levels over multiple revolutions until a good setting is found. In error recovery, typically the drive is trying to read data from a damaged area and relocate it to an undamaged area. It may be desirable in such a case to maximize the correction power for the associated STMs if they are unreadable. This increases the likelihood of a miscorrection, but it may be possible to use other information to detect this, such as the servo gray code, PES decode, and data ECC. This information may not be available prior to the end of the servo sector, but it doesn't need to be for a recovery read operation. If the other information indicates a likely miscorrection (by not agreeing with expected values), then the operation can be retried. There may be situations where the data recovery procedure is affected by miscorrections of STMs. In such cases, it may be beneficial to increase the error detection level during the recovery to avoid possible timing and tracking errors induced by a miscorrected STM.

Another important use of the programmable correction power is to increase manufacturing yield and to reduce test time. Disk drive manufacturing typically includes a test of the servo quality, including the STM patterns. Without programmability and error rate reporting, the tests are slow since it is difficult to stress the system. These prior systems rely on either finding the STM or not. Programmability allows the servo test to be performed at the level of correction and detection best suited to the test, which may not be the same as the nominal operating level. Further, the reporting of the number of errors corrected allows for the drive to operate at one level, while the test screen is performed at a different level. This has important advantages. First, the servo performance during the test can be controlled independently of the screening criteria. This allows specific servo patterns to be flagged as bad with one number of errors, but allows the servo during testing to still use the STM, keeping the servo tracking more accurate. Second, it allows for stressing the system by allowing the test to flag STMs at fewer errors than would result in an uncorrectable STM. For example, a system using a (16, 3, 7) code might choose s=2 and t=2 as the nominal operating point. That is, it will find an STM with 0, 1, or 2 bits in error, and halt the search with 3 or 4 bits in error. During the manufacturing test, it is beneficial for the servo to operate with these values for s and t. However, at manufacturing, it may be determined that STMs with 2 corrected errors should be flagged as bad, as 1 additional error in the STM would result in loss of the associated servo sector. Further, manufacturing yield will be increased if STMs are not flagged as bad with a single error as the STM will still be found, even if a second error were to occur in it at some time in the future. Therefore, the test procedure will monitor the number of errors corrected and effectively operate at a different correction level than the disk drive. This approach will prevent STMs flagged for 2 errors from affecting the servo tracking. If the level of correction was lowered to 1 error for the drive as well, then when 2 errors occur, the associated servo information is lost and the tracking accuracy diminished. This increases the likelihood that subsequent servo sectors will be stressed due to the loss of the position and timing information from the prior servo sector, possibly resulting in their being erroneously flagged as bad. Further enhancements are clearly possible, such as looking at the temporal and spatial occupancy of correctable errors as well. This example show the benefits of improved yield (by allowing single errors to pass) and improved test time by stressing the test conditions without stressing the operating conditions. It is not necessary to flag only STMs which have failed outright.

The preamble pattern of . . . 111 . . . has been used in all the examples described here. However, different preamble patterns may be used. It has also been shown how codes and systems for handling isolated errors and burst errors may be designed. From this, codes and systems for arbitrary error criteria can be designed, for example, a 3-burst and an isolated error, or an interleaved burst error. The codes described are for the most likely channel properties, such as are encountered in peak detect and PRML channels.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A data recording disk drive that has a recording disk and a recording head that reads information from the disk, the disk drive comprising:
 a disk having a plurality of tracks, each track having a plurality of servo sectors containing servo information for determining recording head position, each of the servo sectors also containing a servo timing mark (STM) recorded on the disk and being represented as a pattern of n bits of digital information, each of the tracks having a set of m unique STM patterns, where m is greater than one;
 a motor for rotating the disk;
 a recording head which reads information in the servo sectors;
 an actuator connected to the head for positioning the head to different tracks and maintaining the head on the tracks;
 an STM decoder for detecting each of the m unique STM patterns read by the head as the disk rotates to thereby signal the presence of servo sectors; and
 servo electronics coupled to the STM decoder for controlling the actuator in response to servo information read by the head from the servo sectors after detection of the STMs by the STM decoder; and
 wherein each of the m unique STM patterns of n bits has a minimum sliding distance d to every other STM pattern in the set, where d is greater than one.

2. The disk drive according to claim 1 wherein the disk is a magnetic recording disk, and wherein the tracks are generally concentric and also have a plurality of data sectors interspersed with the servo sectors.

3. The disk drive according to claim 1 wherein one of the STMs in the set is an index STM representing a unique location on the track.

4. The disk drive according to claim 2 wherein one of the index STMs represents the start of the track.

5. The disk drive according to claim 1 wherein one of the STMs in the set is an even sector number STM representing an even-numbered servo sector and another of the STMs in the set is an odd sector number STM representing an odd-numbered servo sector.

6. The disk drive according to claim 1 wherein a plurality of the STM patterns are arranged such that each of the STM patterns represents a portion of the servo sector number in which the STM pattern is located.

7. The disk drive according to claim 1 wherein a plurality of the STM patterns are arranged such that each of the STM patterns represents a portion of the number of the recording head associated with the disk on which the STM patterns are recorded.

8. The disk drive according to claim 1 wherein a plurality of the STM patterns are arranged such that each of the STM patterns represents a portion of the number of the track in which the STM patterns are recorded.

9. The disk drive according to claim 1 wherein each of the servo sectors also includes a preamble pattern, and wherein each of the m unique STM patterns of n bits has a minimum sliding distance d to the concatenation of the preamble pattern and each of the STM patterns.

10. The disk drive according to claim 1 wherein the preamble pattern is an automatic gain control (AGC) pattern.

11. The disk drive according to claim 1 wherein the sliding distance d is to single bit errors, and wherein the STM decoder includes means for correctly identifying each of the m STM patterns in the presence of up to s bits in error in the bits read from the head which contain the concatenation of a preamble pattern with one of the STM patterns, where s represents the STM error correction power of the set of m unique STM patterns and is less than or equal to (d−1)/2.

12. The disk drive according to claim 11 wherein the STM decoder further comprises a shift register for converting serial bits of the STM patterns read by the head into n parallel bits, storage means for storing fixed bit patterns corresponding to the m unique STM patterns in the set, means for determining the exclusive OR of the output of the shift register with the fixed STM bit patterns, and means for generating an STM found signal when the number of ones in the exclusive OR'ed output is less than or equal to s.

13. The disk drive according to claim 12 wherein the STM decoder further comprises means for generating an STM corrected error signal when the number of ones in the exclusive OR'ed output is greater than zero and less than or equal to s, said STM corrected error signal representing a correctly identified STM pattern having one of more bits in error.

14. The disk drive according to claim 13 wherein the STM decoder further comprises means for logging the number of STM corrected error signals generated during a predetermined time interval.

15. The disk drive according to claim 13 wherein the STM decoder further comprises means for generating an STM corrected error count signal corresponding to the number of ones in the exclusive OR output when the number of 1's is greater than zero and less then or equal to s.

16. The disk drive according to claim 15 wherein the STM decoder further comprises means for logging the STM corrected error count values in a predetermined time interval.

17. The disk drive according to claim 12 wherein s=(d−1)/2, and wherein the STM decoder further comprises means for generating an STM missed signal when the number of ones in the exclusive OR'ed output remains greater than s during a predetermined time window.

18. The disk drive according to claim 12 wherein the STM decoder further comprises a programmable storage means for storing the value s, whereby the STM error correction power may be modified in the disk drive.

19. The disk drive according to claim 12 wherein the storage means for storing the fixed STM patterns is programmable, whereby the fixed STM patterns may be modified in the disk drive.

20. The disk drive according to claim 12 wherein the shift register includes a preloaded pattern.

21. The disk drive according to claim 20 wherein the preloaded pattern is a preamble pattern.

22. The disk drive according to claim 1 wherein the STM decoder includes means for correcting up to s bits in error in each of the m STM patterns, and means for detecting without correcting up to s+t bits in error in each of the m STM patterns, where (2s+t) is less than or equal to (d−1).

23. The disk drive according to claim 22 wherein the STM decoder further comprises a shift register for converting serial bits read by the head into n parallel bits, storage means for storing bit patterns corresponding to the m unique STM patterns in the set, means for determining the exclusive OR of the output of the shift register with the fixed STM bit patterns, and means for generating an STM found signal when the number of ones in the exclusive OR'ed output is less than or equal to s.

24. The disk drive according to claim 23 wherein the STM decoder further comprises means for generating an STM corrected error count signal corresponding to the number of ones in the exclusive OR output, when the number of ones is greater than zero and less than or equal to s.

25. The disk drive according to claim 24 wherein the STM decoder further comprises means for logging the STM corrected error count values in a predetermined time interval.

26. The disk drive according to claim 23 wherein the STM decoder further comprises means for generating an STM uncorrectable error signal when the number of ones in the exclusive OR'ed output is greater than s, but less than or equal to s+t.

27. The disk drive according to claim 23 wherein the STM decoder further comprises means for generating an STM missed signal when the number of ones in the exclusive OR'ed output remains greater than s+t for a predetermined time window.

28. The disk drive according to claim 22 wherein the STM decoder further comprises a programmable storage means for storing the value s, whereby the STM error correction power may be modified in the disk drive.

29. The disk drive according to claim 22 wherein the storage means for storing the fixed STM patterns is programmable, whereby the STM patterns may be modified in the disk drive.

30. The disk drive according to claim 1 wherein the sliding distance d is to bursts of up to b consecutive bits in error, and wherein the STM decoder includes means for correctly identifying each of the m STM patterns in the presence of up to s bursts of up to b consecutive bits in error in the data read from the head which contain the concatenation of a preamble pattern with one of the STM patterns, where s represents the STM burst error correction power for bursts up to b bits and is less than or equal to (d−1)/2.

31. The disk drive according to claim 1 wherein the STM decoder includes a set of at least m registers for holding the m STM patterns.

32. The disk drive according to claim 31 wherein the STM decoder includes a register for selecting a number of STM patterns different from the number of STM pattern registers.

33. The disk drive according to claim 31 wherein the STM decoder includes a register for selecting the level of correction or detection.

34. The disk drive according to claim 33 wherein the register for selecting the level of correction or detection stores the correction value s.

35. The disk drive according to claim 33 wherein the disk drive includes means for retrying to read STMs, and wherein the level of correction or detection in the register for selecting the level of correction or detection is selected in response to an STM read retry.

36. The disk drive according to claim 33 wherein the level of correction or detection in the register for selecting the level of correction or detection is selected in response to the number of stored bits in error.

37. A fixed-block architecture embedded servo magnetic recording disk drive that has a magnetic recording disk and a recording head that reads information from and writes information to the disk, the disk drive comprising:

a magnetic recording disk having a plurality of generally concentric data tracks, each track being divided into a plurality of data sectors and a plurality of angularly-spaced servo sectors containing servo information for determining recording head position, each of the servo sectors also containing a servo timing mark (STM) recorded ont he disk and being represented as a pattern of n bits of digital information, each of the tracks having a set of m unique STM patterns, where m is greater than one;

a motor for rotating the disk;

a recording head which reads information in the servo sectors and which writes and reads user data in the data sectors;

an actuator connected to the head for positioning the head to different data tracks and maintaining the head on the data tracks during read and write operations;

an STM decoder for detecting each of the m unique STM patterns read by the head as the disk rotates to thereby signal the presence of servo sectors; and servo electronics coupled to the STM decoder for controlling the actuator in response to servo information read by the head from the servo sectors after detection of the STMs by the STM decoder; and wherein each of the m unique STM patterns of n bits has a minimum sliding distance d to every other STM pattern in the set, where d is greater than one.

38. The disk drive according to claim 37 wherein one of the STMs in the set is an index STM representing the start of the data track.

39. The disk drive according to claim 37 wherein one of the STMs in the set is an even sector number STM representing an even-numbered servo sector and another of the STMs in the set is an odd sector number STM representing an odd-numbered servo sector.

40. The disk drive according to claim 37 wherein a plurality of the STM patterns are arranged such that each of the STM patterns represents a portion of the servo sector number in which the STM pattern is located.

41. The disk drive according to claim 37 wherein a plurality of the STM patterns are arranged such that each of the STM patterns represents a portion of the number of the recording head associated with the disk on which the STM patterns are recorded.

42. The disk drive according to claim 37 wherein a plurality of the STM patterns are arranged such that each of the STM patterns represents a portion of the number of the data track in which the STM patterns are recorded.

43. The disk drive according to claim 37 wherein each of the servo sectors also includes an automatic gain control (AGC) pattern, and wherein each of the m unique STM patterns of n bits has a minimum sliding distance d to the AGC pattern.

44. The disk drive according to claim 37 wherein the sliding distance d is to single bit errors, and wherein the STM decoder includes means for correctly identifying each of the m STM patterns in the presence of up to s bits in error in the bits read from the head which contain the concatenation of a preamble pattern with one of the STM patterns, where s represents the STM error correction power of the set of m unique STM patterns and is less than or equal to (d−1)/2.

45. The disk drive according to claim 44 wherein the STM decoder further comprises a shift register for converting serial bits of the STM patterns read by the head into n parallel bits, storage means for storing fixed bit patterns corresponding to the m unique STM patterns in the set, means for determining the exclusive OR of the output of the shift register with the fixed STM bit patterns, and means for generating an STM found signal when the number of ones in the exclusive OR'ed output is less than or equal to s.

46. The disk drive according to claim 45 wherein the STM decoder further comprises means for generating an STM corrected error signal when the number of ones in the exclusive OR'ed output is greater than zero and less than or equal to s, said STM corrected error signal representing a correctly identified STM pattern having one of more bits in error.

47. The disk drive according to claim 46 wherein the STM decoder further comprises means for logging the number of STM corrected error signals generated during a predetermined time interval.

48. The disk drive according to claim 46 wherein the STM decoder further comprises means for generating an STM corrected error count signal corresponding to the number of ones in the exclusive OR output when the number of 1's is greater than zero and less then or equal to s.

49. The disk drive according to claim 48 wherein the STM decoder further comprises means for logging the STM corrected error count values in a predetermined time interval.

50. The disk drive according to claim 45 wherein s=(d−1)/2, and wherein the STM decoder further comprises means for generating an STM missed signal when the number of ones in the exclusive OR'ed output remains greater than s during a predetermined time window.

51. The disk drive according to claim 44 wherein the STM decoder further comprises a programmable storage means for storing the value s, whereby the STM error correction power may be modified in the disk drive.

52. The disk drive according to claim 44 wherein the storage means for storing the fixed STM patterns is programmable, whereby the fixed STM patterns may be modified in the disk drive.

53. The disk drive according to claim 37 wherein the STM decoder includes means for correcting up to s bits in error in each of the m STM patterns, and means for detecting without correcting up to s+t bits in error in each of the m STM patterns, where (2s+t) is less than or equal to (d−1).

54. The disk drive according to claim 53 wherein the STM decoder further comprises a shift register for converting serial bits read by the head into n parallel bits, storage means for storing bit patterns corresponding to the m unique STM patterns in the set, means for determining the exclusive OR of the output of the shift register with the fixed STM bit patterns, and means for generating an STM found signal when the number of ones in the exclusive OR'ed output is less than or equal to s.

55. The disk drive according to claim 54 wherein the STM decoder further comprises means for generating an STM corrected error count signal corresponding to the number of ones in the exclusive OR output when the number of ones is greater than zero and less than or equal to s.

56. The disk drive according to claim 55 wherein the STM decoder further comprises means for logging the STM corrected error count values in a predetermined time interval.

57. The disk drive according to claim 54 wherein the STM decoder further comprises means for generating an STM uncorrectable error signal when the number of ones in the exclusive OR'ed output is greater than s, but less than or equal to s+t.

58. The disk drive according to claim 54 wherein the STM decoder further comprises means for generating an STM missed signal when the number of ones in the exclusive OR'ed output remains greater than s+t for a predetermined time window.

59. The disk drive according to claim 53 wherein the STM decoder further comprises a programmable storage means for storing the value s, whereby the STM error correction power may be modified in the disk drive.

60. The disk drive according to claim 53 wherein the storage means for storing the fixed STM patterns is programmable, whereby the STM patterns may be modified in the disk drive.

61. The disk drive according to claim 37 wherein the sliding distance d is to bursts of up to b consecutive bits in error, and wherein the STM decoder includes means for correctly identifying each of the m STM patterns in the presence of up to s bursts of up to b consecutive bits in error in the data read from the head which contain the concatenation of a preamble pattern with one of the STM patterns, where s represents the STM burst error correction power for bursts up to b bits and is less than or equal to (d−1)/2.

* * * * *